United States Patent [19]

Girault

[11] Patent Number: 5,197,851

[45] Date of Patent: Mar. 30, 1993

[54] AXIAL FLOW TURBOPUMP WITH INTEGRATED BOOSTING

[75] Inventor: Jean-Philippe N. Girault, Tourny, France

[73] Assignee: Societe Europeenne de Propulsion, Suresnes, France

[21] Appl. No.: 815,125

[22] Filed: Dec. 27, 1991

[30] Foreign Application Priority Data

Dec. 31, 1990 [FR] France .............................. 90 16548

[51] Int. Cl.$^5$ .............................................. F01D 1/12
[52] U.S. Cl. .................................. 415/58.5; 415/58.7;
415/111; 415/66; 415/68; 415/69; 415/143;
415/115
[58] Field of Search ............ 415/110, 111, 115, 216.1,
415/143, 52.1, 58.4, 58.5, 58.7, 66, 68, 69

[56] References Cited

U.S. PATENT DOCUMENTS

| | | |
|---|---|---|
| 358,777 | 3/1887 | Hay .......................................... 415/69 |
| 2,771,036 | 11/1956 | Baez ......................................... 415/69 |
| 2,832,292 | 4/1958 | Edwards ............................. 415/58.4 |
| 3,004,494 | 10/1961 | Corbett . | 
| 3,093,084 | 6/1963 | Derderian . |
| 3,103,176 | 9/1963 | Lang et al. . |
| 3,993,164 | 11/1976 | Brown ..................................... 415/110 |
| 4,400,134 | 8/1983 | Sweeny .................................. 415/69 |
| 4,408,953 | 10/1983 | Nasvytis et al. ...................... 415/62 |
| 4,449,888 | 5/1984 | Balje ...................................... 415/143 |
| 4,588,352 | 5/1986 | Kako ...................................... 415/110 |

FOREIGN PATENT DOCUMENTS

| | | |
|---|---|---|
| 0060993 | 9/1982 | European Pat. Off. . |
| 0374020 | 6/1990 | European Pat. Off. . |
| 885050 | 7/1949 | Fed. Rep. of Germany . |
| 1001113 | 6/1957 | Fed. Rep. of Germany . |
| 1343011 | 10/1963 | France . |

OTHER PUBLICATIONS

"Better Power/Speed Cavitation for Centrifugal Pumps", O. V. Baibakov, et al, Russian Engineering Journal, vol. 53, No. 11, 1973, pp. 31–35.

Primary Examiner—Thomas E. Denion
Attorney, Agent, or Firm—Weingarten, Schurgin, Gagnebin & Hayes

[57] ABSTRACT

Inside a single casing the turbopump comprises a main shaft driven by a turbine, a secondary shaft coaxial with the main shaft, at least one low pressure boost impeller mounted on the secondary shaft. The LP fluid flow is brought parallel to the axis of the turbopump by a baffle and after being deflected through 180° in a return channel it is returned parallel to the axis of the turbopump toward a high pressure impeller mounted on the main shaft inside the secondary shaft. The entire HP flow formed by the HP impeller is delivered axially to a boost turbine secured to the secondary shaft and to the LP boost impeller and disposed between the main shaft and the secondary shaft. Through orifices and an axial channel are formed in the main shaft to pass the flow of HP fluid leaving the boost turbine inside the main shaft and then to exhaust the HP fluid to a delivery channel secured to the casing through the radial arms situated at the inlet to the turbopump.

17 Claims, 7 Drawing Sheets

AXIAL FLOW TURBOPUMP WITH INTEGRATED BOOSTING

FIELD OF THE INVENTION

The present invention relates to an axial flow turbopump with integrated boosting, for pressurizing a fluid.

Turbopumps are used in various different fields, and in particular in space for pressurizing propellant components.

The search for a turbopump of increased throughput with a simultaneous reduction in size and mass leads to using high speeds of rotation.

At high speeds of rotation, the risk of cavitation increases. That is why proposals have already been made to associate a high pressure pump with a low pressure boost pump, the boost pump providing the increase in pressure needed at the inlet to the high pressure impeller to avoid any cavitation at high speeds of rotation.

PRIOR ART

Different ways of driving a low pressure boost pump and different ways of associating the low pressure (LP) and high pressure (HP) circuits have already been proposed.

Thus, a conventional way of driving a low pressure boost pump 3 shown diagrammatically in FIG. 2A is constituted by a branch circuit. In that case, a portion 7 of the HP fluid conveyed by the high pressure pump 1 is recycled from the outlet from the HP pump 1 to the low pressure hydraulic turbine 4 which is used for driving the LP boost pump 3. The LP fluid 5 inserted into the LP pump 3 has a medium pressure (MP) at the outlet thereof such that the flow of medium pressure fluid 6 applied to the inlet of the HP pump 1 enables all cavitation within the HP pump 1 to be avoided even if it operates at a high speed of rotation. The HP fluid 7 recycled via the hydraulic turbine 4 driving the shaft 42 of the LP pump 3 constitutes only a relatively small fraction of the working HP flow 8. The shaft 41 of the HP pump 1 is itself driven in conventional manner by a gas turbine 2 having an HP gas inlet 9 and an LP gas outlet 10.

FIG. 2B shows a particular embodiment of a pump such as that shown diagrammatically in FIG. 2A and as described in the NASA monograph entitled "Turbopump systems for liquid rocket engines" SP-8107, pp. 53-55. FIG. 2B thus shows an LP boost pump 3 driven by a hydraulic turbine 4 fed by a fraction 7 of the HP fluid 8 delivered by the HP pump 1, in turn driven by a gas turbine (not shown in FIG. 2B).

Systems of the type described with reference to FIGS. 2A and 2B require bulky high pressure to low pressure hydraulic connections that are difficult to seal, with recycling a small flow rate under large head losses not providing the best functional compromise and not enabling all of the cavitation problems at the HP impeller of the HP pump 1 to be remedied. In addition, using an "in line" structure in which the LP pump 3 is located ahead of the HP pump 1 gives rise to a hydraulic assembly that is bulky.

FIGS. 3A to 3D show systems that associate an LP boost pump 13 with an HP pump 11, using a cascade circuit. FIG. 3A is a theoretical diagram of such a system, in which the entire fluid flow 17 leaving the HP pump 11 actuates, with little expansion, the LP hydraulic turbine 14 which drives the boost pump 13 via the LP shaft 42, which boost pump receives the inlet LP fluid flow 15 and applies it to the inlet of the HP wheel of the HP pump 11 in the form of a fluid flow 16 at medium pressure. As in the system of FIG. 2A, the shaft 41 of the HP pump 11 delivers an outlet flow 18 which is conventionally entrained by a gas turbine 12 having an HP gas inlet 19 and an LP gas outlet 20.

FIGS. 3B and 3C show one embodiment of the FIG. 3A circuit as applied to a low power boost pump 13. FIG. 3B shows the arrangement of the various components of the FIG. 3A system apart from the gas turbine 12 which is not shown, and FIG. 3C shows in simplified manner the relative positions in the FIG. 3B arrangement of the main drive shaft 41 driven by the gas turbine 12 and of the hydraulically driven shaft 41 together with its bearings 43, 44 for supporting it relative to a frame. FIG. 3C shows symbolically the rotary components that rotate with the shafts 41 and 42, i.e. the rotary components of the hydraulic turbine 14 and of the LP pump 13 which are secured to the LP secondary shaft 42 and the rotary components of the HP pump 11 which are secured to the main HP shaft 41.

FIG. 3D shows another particular embodiment of a circuit that uses a cascade cycle like that shown in FIG. 3A, and as described in a work by O.E. Balje entitled "Turbomachines", p. 429, published by Wiley in 1981. In that case, the hydraulic turbine 14 is constituted by a rotary diffuser placed downstream from the HP impeller of the HP pump 11 and secured to an LP inducer 13 which performs a function of the same kind as the boost pump 13 in FIG. 3A, and which is placed upstream from the impeller of the HP pump 11.

Nevertheless, experiments performed on an arrangement such as that shown in FIG. 3D have encountered complex problems with bearings, and have been limited to tests at low speed and low power.

FIG. 4 shows a theoretical diagram for a turbopump system having a boost LP pump in which a boost LP pump 23 is integral with a shaft 42 driven by a gas turbine 24 fed from a main gas flow 31 for driving the HP pump 21. In FIG. 4, reference 29 designates the HP gas flow applied to the main gas turbine 22 and 32 designates the LP gas flow from the auxiliary gas turbine 24. References 25, 26, and 28 respectively designated the LP liquid flow at the inlet to the boost pump 23, the MP liquid flow from the boost pump 23 as applied to the HP pump 21, and the HP liquid flow delivered by the HP pump 21.

A system such as that shown in FIG. 4 suffers from problems of differential expansion between its cold parts adjacent to the pump and its hot parts adjacent to the turbine, and from problems of sealing between the liquid circuits and the gas circuits, which problems are inherent to the cycle shown. A cycle of the kind shown in FIG. 4 is also to be proscribed when using fluids that are chemically very active, such as liquid oxygen.

In general, systems such as that shown in FIG. 4 present high levels of power per unit mass, are complex, and because they associate two turbomachines, they suffer from considerable bulk. Such an architecture is difficult to assemble, requires a large number of parts, and multiple fixing points that may lead to difficult vibration problems in structures that are suspended from the propulsion chamber.

OBJECT AND SUMMARY OF THE INVENTION

The present invention seeks to remedy the drawbacks of the prior art systems and to enable a low pressure boost pump to be used in association with a turbopump for the purpose of eliminating or limiting the phenomenon of cavitation in the portion of the high pressure pump that operates at very high speeds of rotation, while providing a high degree of compactness overall and while still retaining a high level of performance.

These objects are achieved by an axial flow turbopump with integrated boosting for pressurizing a fluid, characterized in that it comprises within a single casing: a main shaft driven by a turbine, a secondary shaft coaxial with the main shaft, at least one low pressure inducer mounted inside the casing on the secondary shaft in the vicinity of an inlet for low pressure working fluid, at least one low pressure boost impeller mounted on the secondary shaft downstream from the low pressure inducer, a low pressure baffle secured to the casing and disposed downstream from the low pressure impeller to restore the medium pressure fluid flow parallel to the axis of the turbopump, a return channel for deflecting the medium pressure fluid flow from the baffle through 180° and for returning said flow parallel to the axis of the turbopump towards a high pressure impeller mounted on the main shaft inside the secondary shaft in such a manner as to deliver the entire high pressure centrifugal flow formed by the high pressure impeller axially towards a boost turbine secured to the second shaft and the low pressure boost impeller and disposed between the main shaft and the secondary shaft, through orifices and an axial channel being formed in the main shaft to enable the flow of high pressure fluid leaving the boost turbine inside the main shaft to pass and then to exhaust the high pressure fluid towards a delivery channel secured to the casing via radial arms situated at the inlet of the turbopump, the high pressure impeller constituting a high pressure pump coupled to a low pressure boost pump constituted by the low pressure inducer and the low pressure boost impeller and constituting a unitary assembly.

The turbopump further includes a high pressure inducer mounted on the main shaft between the return channel and the high pressure impeller.

By the principle which consists in sharing the power between a low pressure pump and a high pressure pump incorporated in the low pressure pump it is possible for a turbopump of the invention to obtain high efficiency with the possibilities for optimizing the pumps being as great or even greater than with separate pumps, and while obtaining a high speed of rotation. The shorter the circuits compared with prior art systems such as those of FIGS. 2A, 2B, 3A to 3D, and 4, the shorter the in-line head losses, and consequently the higher the efficiency.

The particularly compact architecture of the turbopump of the invention with the turbomachine having integrated therein a rotary supercharger constituted by a boosting impeller driven by the pressurized fluid itself and intended to increase the pressure of the fluid at its inlet into the main pump gives rise to a significant decrease in the total mass of the machine and in its bulk while reducing the number of parts it requires and without increasing the difficulty of producing the parts.

These advantages are particularly important in the context of a turbopump for a rocket engine insofar as the architecture of the machine and its installation on the propulsive assembly are both greatly simplified by the reduction in the number of parts and of connections to the engine.

Reducing the time required for assembling the machine and for installing it on the propulsive assembly reduces costs.

Reducing the number of members, sensitivity to vibration, and complexity in assembly increases safety in operation.

Overall design is simplified because there are no special circuits for recovering and handling leaks of liquid or of gas, and it is possible to use a delivery channel that is simpler in shape than a volute (it may even be a torus), thereby reducing cost.

The low pressure boost pump defines a low pressure fluid flow that is essentially parallel to the axis of the turbopump, whereas the high pressure pump is arranged in such a manner that the high pressure impeller delivers the high pressure fluid axially towards the inside of the main shaft and then towards the delivery channel in a plane that is approximately perpendicularly to the axis of the turbopump by passing through the flow of low pressure fluid via said radial arms and without exchanging mechanical energy the low pressure fluid.

The main shaft driven at high speed by the turbine is mounted relative to the casing firstly by means of ball bearings disposed between said radial arms and the front end of the main shaft and secondly by a bearing suitable for high speeds and mounted in the backplate of the return channel.

The secondary shaft is mounted on the main shaft via a roller bearing and via ball bearings.

This disposition with four bearings makes it possible to obtain a high speed for rotation for the HP main shaft and free rotation for the low pressure assembly driven by the hydraulic turbine.

It may be observed that the bearings placed between the LP pump and the HP pump rotate at a low relative speed which corresponds to the difference between the speeds of rotation of the HP main shaft and of the LP secondary shaft. As a result, the bearings are subject to little wear and their lifetime is increased.

In a particular embodiment, said bearing mounted in the backplate of the return channel is a ball bearing that is lubricated and cooled by a low flow rate of high pressure fluid taken from the axial channel by a short recirculation channel formed in the main shaft and delivered into the return channel by a short channel.

In another particular embodiment, said bearing mounted in the backplate of the return channel is a fluid bearing or a foil bearing fed with a small flow rate of high pressure fluid taken from the axial channel by a short recirculation channel formed in the main shaft and delivered into the return channel by a short channel.

In yet another particular embodiment, said bearing mounted in the backplate of the return channel is an active magnetic bearing cooled by a low flow rate of high pressure fluid taken from the axial channel by a short recirculation channel formed in the main shaft and delivered into the return channel by a short channel.

The turbopump is characterized in that the ball bearings disposed between the radial arms and the front end of the main shaft are lubricated and cooled by means of the flow of high pressure working fluid from the axial channel and delivered towards the delivery channel.

This disposition avoids any external pipework, minimizes in-line losses, and ensures flow rate, boost pressure, and temperature operating conditions that are optimal for the bearing supporting the main shaft at high speed. It also ensures that assembly is very simple and it reduces the number of parts, thereby contributing to reducing costs and to increasing operating reliability.

The turbopump includes dynamic sealing means between the secondary shaft constituting the rotor of the low pressure pump and the members secured to the main shaft constituting the rotor of the high pressure pump, which means comprise fluid seals such as wiper labyrinths, rings, or floating rings.

In a preferred embodiment, the turbopump includes first and second successive sets of oppositely-directed seals disposed respectively between the secondary shaft and the rotor of the high pressure pump, and between the secondary shaft and the low pressure baffle secured to the casing.

The fluid seals provide clearance in operation making it possible both to minimize the leakage rate of HP fluid to the outlet of the LP pump, and to adjust the leakage flow rate to the inlet of the LP pump strictly to the requirements of the bearings disposed between the low pressure portion and the high pressure portion, thereby contributing to optimizing leak control. The flow rate thus taken off to lubricate these bearings in the preferred embodiment is obtained without any additional parts or assembly, and is consistent with the general scheme on which the machine operates.

According to another particular feature of the invention, the turbopump includes dynamic sealing means firstly between the members secured to the secondary shaft forming a portion of the rotor of the low pressure pump and secondly between the radial arms and the main shaft which includes fluid seals such as wiper labyrinths leaving clearance in operation that minimizes the fluid flow rates between the high pressure fluid flow injected into the axial channel and exhausted via the radial arms and the low pressure fluid flow at the inlet.

According to yet another particular feature of the invention, the return channel is delimited by a casting integrated in the casing and provided with reinforcing ribs and a shock absorbing annular gasket is interposed between said casing and the main shaft.

This feature improves the strength of the rotary assembly and contributes to increasing lifetime.

The gas turbine driving the main shaft includes a casing connected via radial studs to the casing of the turbopump.

Thermal decoupling between the pump and the turbine is thus ensured reliably without being detrimental to structural stiffness.

The channels formed through the radial arms may open out into a torus which is itself in communication with the delivery channel.

In a possible variant embodiment, the main shaft and the communication orifice between the axial channel of the main shaft and the radial arms are situated in the plane that is tangential to the inside wall of the radial arms situated adjacent to the low pressure impeller and the high pressure impeller.

This configuration makes it possible to reduce head losses and it simplifies assembly.

BRIEF DESCRIPTION OF THE DRAWINGS

Other characteristics and advantages of the invention appear from the following description of particular embodiments given by way of example and made with reference to the accompanying drawings, in which.

DETAILED DESCRIPTION OF PARTICULAR EMBODIMENTS

Figure 1:
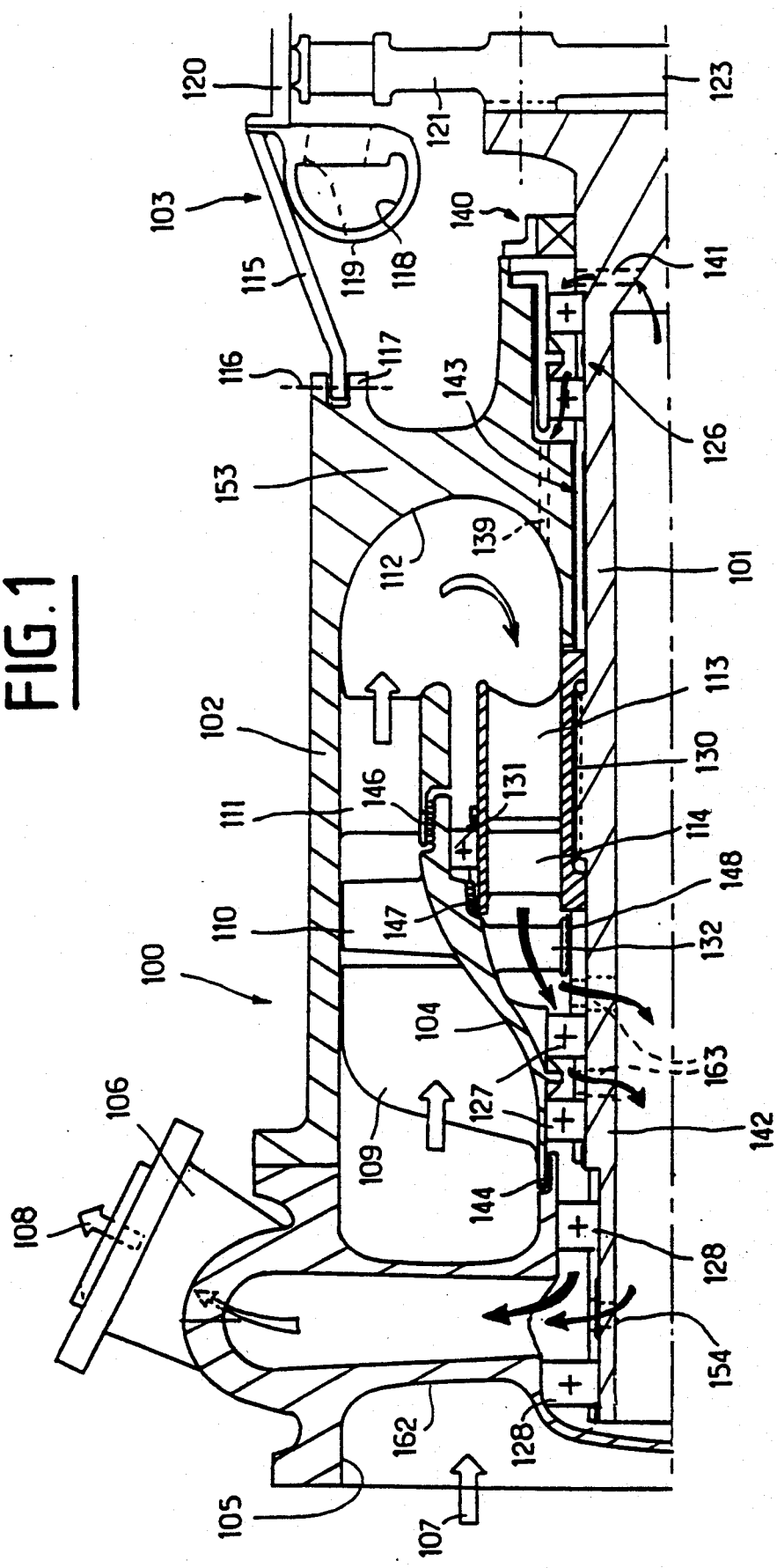
FIG. 1 is an axial section view through an axial flow turbopump with integrated boosting, constituting a particular embodiment of the invention.
Figure 2A:
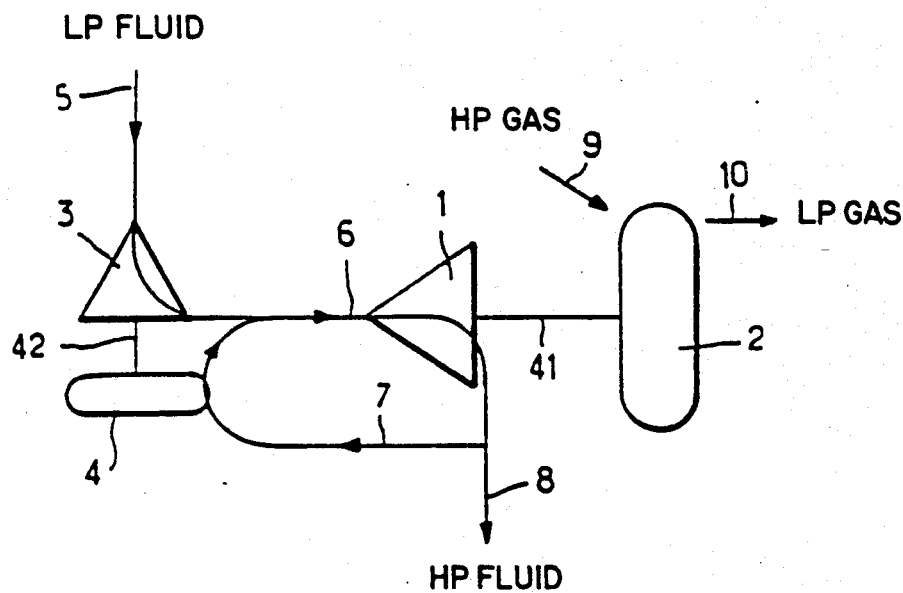
FIG. 2A is a theoretical diagram showing a prior art association between a turbopump and a low pressure boost pump disposed at the inlet to the turbopump and driven by a hydraulic turbine fed with a flow of high pressure fluid taken from the flow of high pressure fluid at the outlet from the turbopump.
Figure 2B:
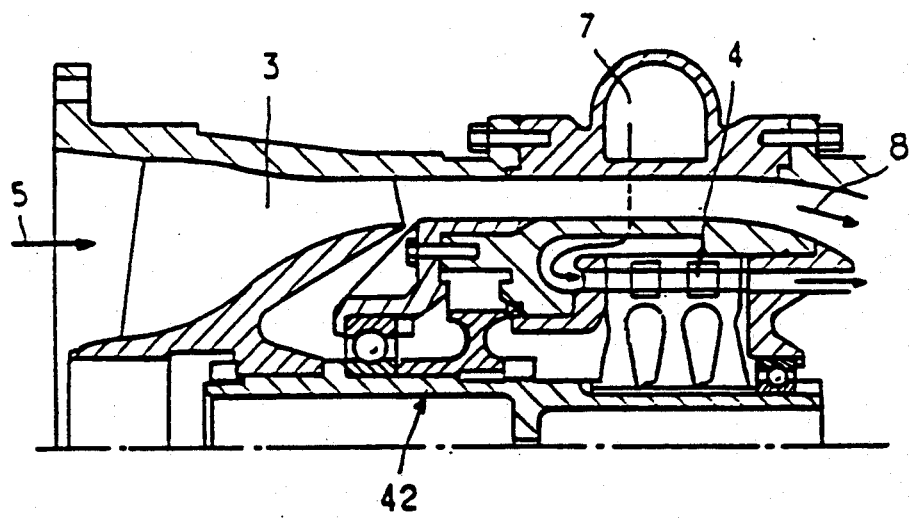
FIG. 2B is an axial half-section view through one example of known architecture for a turbopump associated with a low pressure boost pump in compliance with the theoretical diagram of FIG. 2A.
Figure 3A:
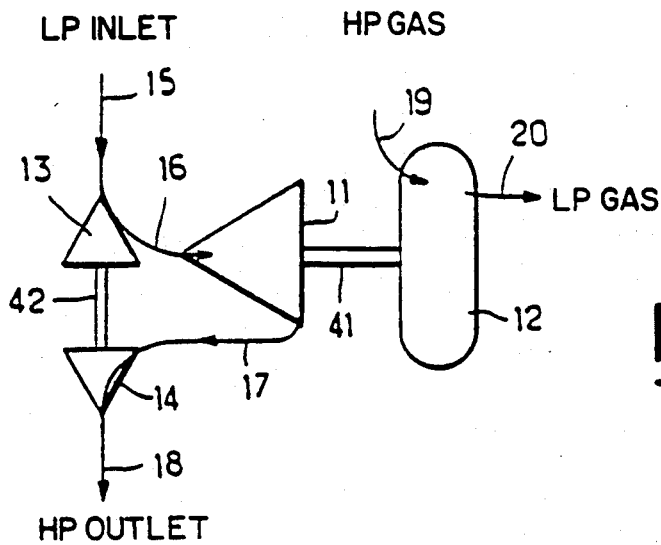
FIG. 3A is a theoretical diagram showing a prior art association of a turbopump and a low pressure boost pump disposed at the inlet of the turbopump and driven by a hydraulic turbine fed in cascade by all of the flow of high pressure at the outlet of the turbopump.
Figure 3B:
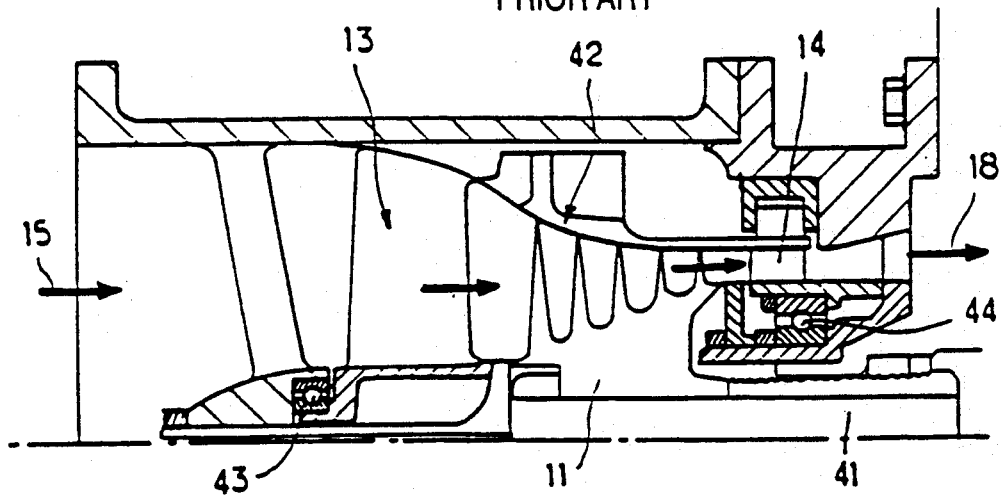
FIG. 3B is an axial half-section view through a first example of known architecture for a turbopump associated with a low power low pressure boost pump in compliance with the theoretical diagram of FIG. 3A.
Figure 3C:
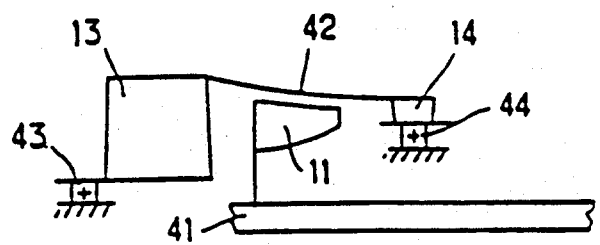
FIG. 3C is a simplified diagram showing some of the components implemented in the architecture of FIG. 3B.
Figure 3D:
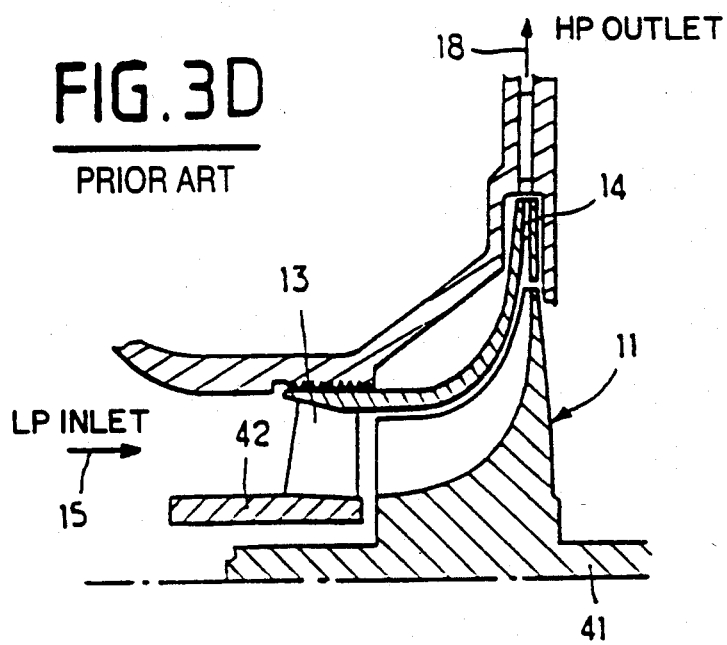
FIG. 3D is an axial half-section view through a second example of known architecture for a turbopump associated with a low pressure inducer in compliance with the theoretical diagram of FIG. 3A, but using greater power than in the architecture of FIGS. 3B and 3C.
Figure 4:
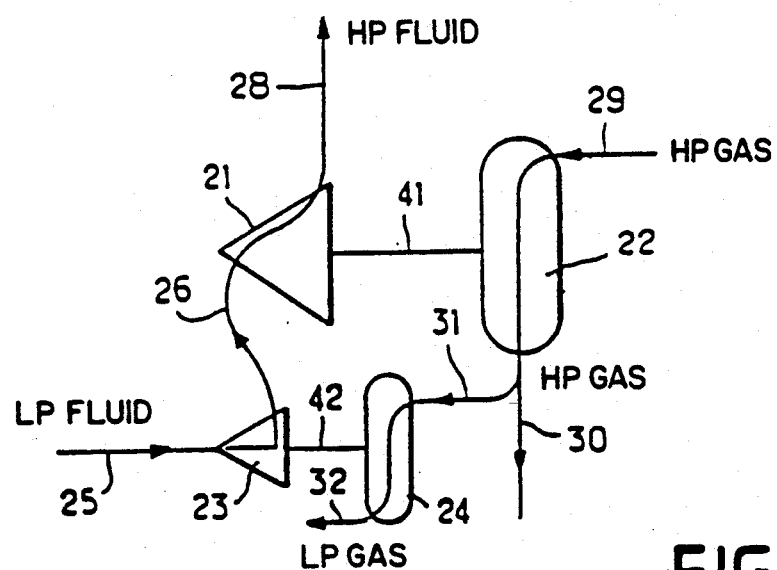
FIG. 4 is a theoretical diagram showing a prior art association of a turbopump and a low pressure boost pump disposed at the inlet to the turbopump and driven by an auxiliary gas turbine fed with a flow of high pressure gas taken from the flow of high pressure gas at the outlet from the main gas turbine for driving the turbopump.

FIG. 1 is an overall view of an axial flow turbopump with integrated boosting in accordance with the invention, and which is more particularly intended to pressurize propellant components for a rocket engine.

According to an essential aspect of the invention, a single casing 102 contains the active components of an HP pump driven via a main shaft 101 by an external gas turbine 103, together with the active components of an LP pump secured to a secondary shaft 104 which is coaxial with the main shaft 101, the secondary shaft 104 itself being driven directly by the LP impeller 110 secured to a hydraulic turbine 132 driven by the HP fluid from the outlet of the HP pump passes. The HP impeller 114 of the HP pump mounted on the main shaft 101 is integrated inside the LP impeller 110 so as to enable the flow of HP fluid delivered by the HP impeller 114 at the specified pressure and flow rate for the machine as a whole to pass via a delivery channel 106, thereby defining an outlet flow 108 for delivery to components that make use of the HP fluid, while also driving the hydraulic turbine 132.

The LP impeller 110 disposed in the vicinity of the inlet 105 for the liquid 107 exerts a boost function on the HP impeller 114 which is mounted in cascade relative to the LP impeller 110, by enabling a flow of medium pressure (MP) fluid to be applied to the inlet of the HP impeller 114, which MP fluid is suitable for avoiding cavitation phenomena in the HP impeller 114 at high speeds of rotation.

The high level of performance due to the presence of a boost inlet stage constituted by the LP pump is not obtained to the detriment of compactness insofar as the body of the LP pump is integrated with the body of the HP pump, with both the HP pump and the LP pump being coaxial with the machine.

As mentioned above, a hydraulic turbine 132 for driving the LP impeller 110 is combined with a stage of the LP pump and lies substantially in the same radial plane as the LP impeller 110 inside the secondary shaft 104 and immediately at the outlet from the HP impeller 114. Integrating a driving hydraulic turbine in the LP boost impeller 110 contributes to increasing the compactness of the assembly.

The LP pump comprises a rotor constituted by the secondary shaft 104 which carries an LP inducer 105 at its inlet constituting a first suction stage having a large inlet diameter which facilitates obtaining high suction capacity. At least one stage of the LP pump constituting the LP impeller 110 is provided with fairing and hollow blades 132 to enable hydraulic turbine operation by the HP fluid 108 flowing through the insides 133 of the hollow blades 132.

In the embodiment of FIG. 1, the LP pump has only one LP inducer 109 and one LP impeller 110, concentric with the hydraulic turbine 132, but it is possible to make an LP pump having a larger number of stages 109a, 109b, and 109c disposed upstream from the faired LP impeller 110 providing the hydraulic turbine function.

The connection between the outlet of the LP pump and the inlet of the HP pump includes a baffle 111 mounted on the casing 102 of the HP and LP pump assembly and serving to bring the hydraulic flow back onto the axis of the machine so as to avoid any pre-rotation of the fluid at the inlet to the HP impeller 114, in association with a return channel 112 which deflects the flow of medium pressure fluid at the outlet from the baffle 111 through 180° to return it towards the HP impeller 114 parallel to the axis of the turbopump.

Figure 6:
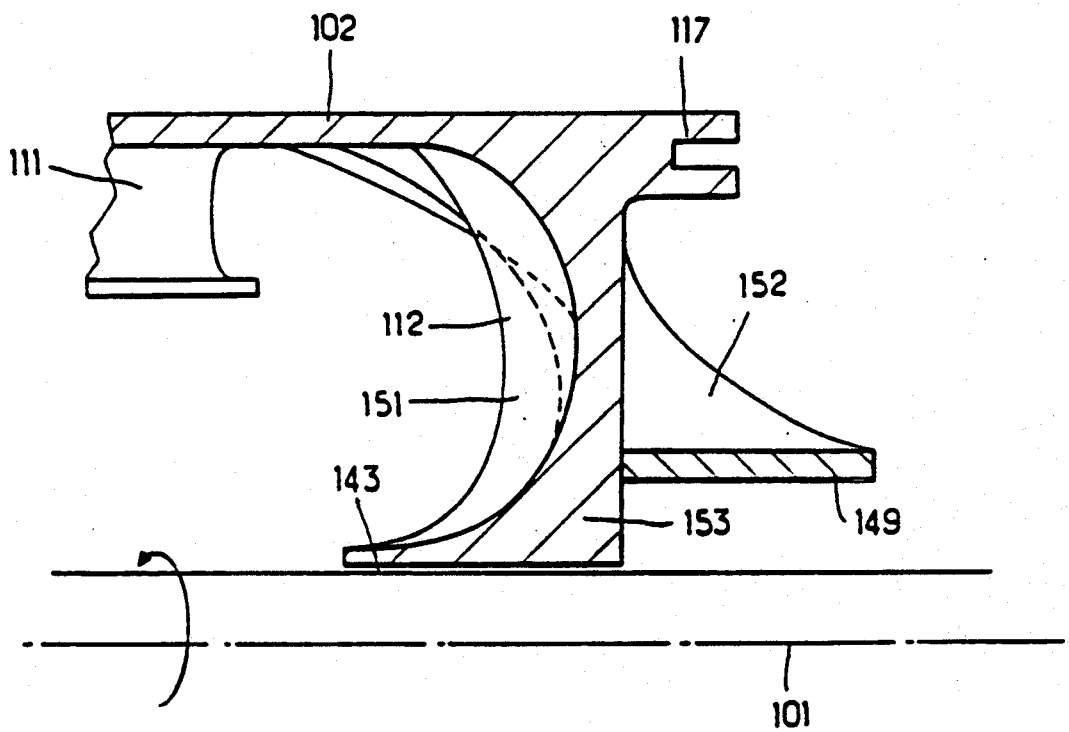
FIG. 6 is a detail view in axial half-section showing an example of the backplate of the high pressure main pump of the FIG. 1 turbopump.

FIG. 6 shows in greater detail the backplate 153 of the pump together with the return channel 112. The return channel 112 is obtained using simple, open shapes starting from a casting 153 provided with ribs or fins 151 and 152 and integral with the pump casing 102, thereby increasing the structural stiffness while leaving a place 143 for receiving a shock absorbing annular gasket 125 between the shaft 101 and the return channel 112. This characteristic makes it possible to obtain a rotary assembly that is stronger, and it contributes to obtaining a long lifetime.

The backplate assembly 153 serves to obtain a housing 149 on the outside wall of the return channel 112 for the purpose of receiving a bearing 126 together with its sealing system 140 (FIG. 1), for the purpose of receiving the rear portion of the main shaft 101 that is secured to the gas turbine 103.

The casing 120 of the gas turbine 103 may be fixed by means of radial studs 116 passing through an end 115 that is directly engaged in flanges 117 formed on the backplate 153 (FIG. 1).

The above-described measures make it possible to obtain good thermal decoupling between the pump and the turbine without detriment to the structural stiffness thereof.

The rotor 130 of the HP pump driven directly by the main central shaft 101 is constituted by an inducer 113 (which may be optional) and by an impeller 114.

Figure 5:
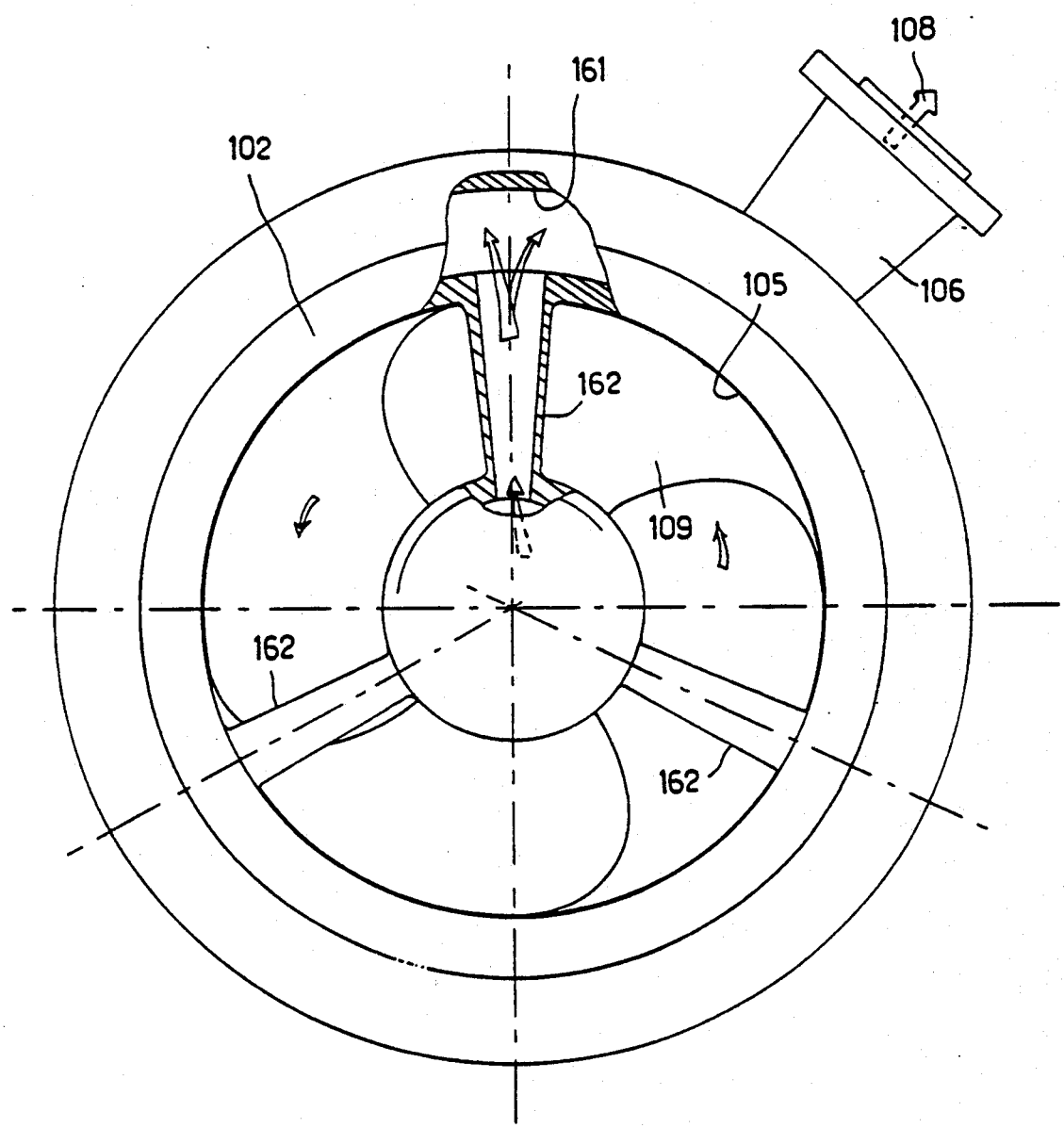
FIG. 5 is a front view in the inlet plane of the FIG. 1 turbopump, which is shown partially cutaway.

The axial flow of HP fluid from the HP impeller 114 passes through the blades of the hydraulic turbine 132 for driving the secondary shaft 104 prior to penetrating via short radial channels 163 into an axial channel 142 formed inside the main shaft 101. The axial flow of HP fluid leaves in the vicinity of the front end of the shaft 101 via further short radial channels 154 to penetrate into the channels formed in the radial arms 162 which in turn open out into a torus 161 which is in communication with the delivery channel 106 (FIGS. 1 and 5). The flow of HP fluid also serves to lubricate and cool the various bearings that are used.

Particular examples of the way in which the main shaft 101 and the secondary shaft 104 are mounted using various types of bearing are now described in greater detail.

The high speed main shaft 101 is mounted firstly by means of a pair of ball bearings 128 disposed between the radial arms 162 integral with the casing 102 and the front end of the main shaft 101, and secondly by means of a bearing 126 suitable for use at high speeds, such as a pair of ball bearings mounted in the backplate 153 of the return channel 112.

The low pressure secondary shaft 104 is itself mounted on the main shaft 101 via a roller bearing 131 disposed between the rear end of the secondary shaft 104 and the fairing of the HP impeller 114, and a pair of ball bearings 127 disposed between the secondary shaft 104 and the main shaft 101 in the vicinity of the radial channels 163, for the purpose of being lubricated and cooled by the HP flow from the turbine 132.

This four-bearing disposition makes it possible to obtain a high speed of rotation for the main shaft 101 and free rotation for the low pressure assembly which is driven by the hydraulic turbine.

It will be observed that the bearings disposed between the LP pump and the HP pump rotate at a relatively low speed which corresponds to the difference between the speeds of rotation of the main shaft 101 and of the secondary shaft 104, such that wear in these bearings is relatively slow.

FIG. 1 shows an embodiment of a bearing 126 for supporting the main shaft 101 at its end adjacent to the gas turbine 103. It can be seen that this bearing 126 which is constituted by way of example by a pair of bearings is lubricated and cooled by a recirculated flow of HP fluid taken from the axial channel 142 via a short channel 141, and is returned through the backplate 153 delimiting the return channel 112 via a short recirculation channel 139 to a medium pressure zone situated upstream from the inducer 113. Such a dispositions avoids any external pipework, minimizes in-line losses, and provides flow rate, boost pressure, and temperature operating conditions that are optimal for the bearing 126 supporting the high speed shaft 101.

It may be observed that the pair of ball bearings 126 shown in FIG. 1 may be replaced by some other type of bearing adapted to high speed. The bearing 126 may thus be a fluid bearing or a foil bearing fed with medium pressure fluid via a recirculation channel entirely analogous to the channel 139 in FIG. 1.

Similarly, the bearing 126 may also be constituted by an active magnetic bearing cooled by a low flow rate of medium pressure fluid taken via the recirculation channel 139.

The gasket 140 serves under all circumstances to provide sealing relative to the zone in which the gas turbine 103 is situated.

The gas turbine 103 may comprise one or more stages 121, 122 mounted directly on the end of the main shaft 101 and providing the power required by both the HP pump and the LP pump.

The turbine wheels 121 are mounted by means of a long tie 123 coaxial with the main shaft 101, and by a resilient thrust member 124 for limiting differential expansion between the parts. The turbine 103 includes a casing 120 including a hot gas feed channel 118 and an annular space 119 for applying the hot gases to the blades of the wheels 121. As already mentioned, one end 115 of the casing 120 of the turbine 103 may be connected to the casing 102 of the HP pump and the LP pump via a connection including radial studs 116.

FIG. 1 also shows examples of dynamic sealing achieved between the secondary shaft 104 constituting the rotor of the LP pump and the members 130, 114 secured to the main shaft 101 constituting the rotor of the HP pump. Fluid seals 147 and 148 such as wiper labyrinths, rings, or floating rings, are thus disposed between the rotor 104 and support 130 of the HP impeller 114. A fluid seal 146 is also disposed between the secondary rotor 104 and the LP baffle 111, with an opening opposing that of the fluid seals 147 and 148. Dynamic sealing means 144 are also disposed between the secondary rotor 104 and the shaft 101, the dynamic sealing means comprise in like manner fluid seals such as wiper labyrinths that leave operating clearance to minimize the fluid flow rates between the HP fluid flow lubricating the bearings 127 and 128, and the LP fluid flow at the inlet 107.

The operating clearances of the various fluid seals also serve to regulate the leakage flow rate to the outside of the LP pump to the strict requirements of the low pressure/high pressure bearings, thereby assisting in providing optimum handling of leaks. The flow rate thus taken off to lubricate these bearings in the preferred embodiment of the invention is obtained without requiring any additional assembly or parts.

Figure 7:
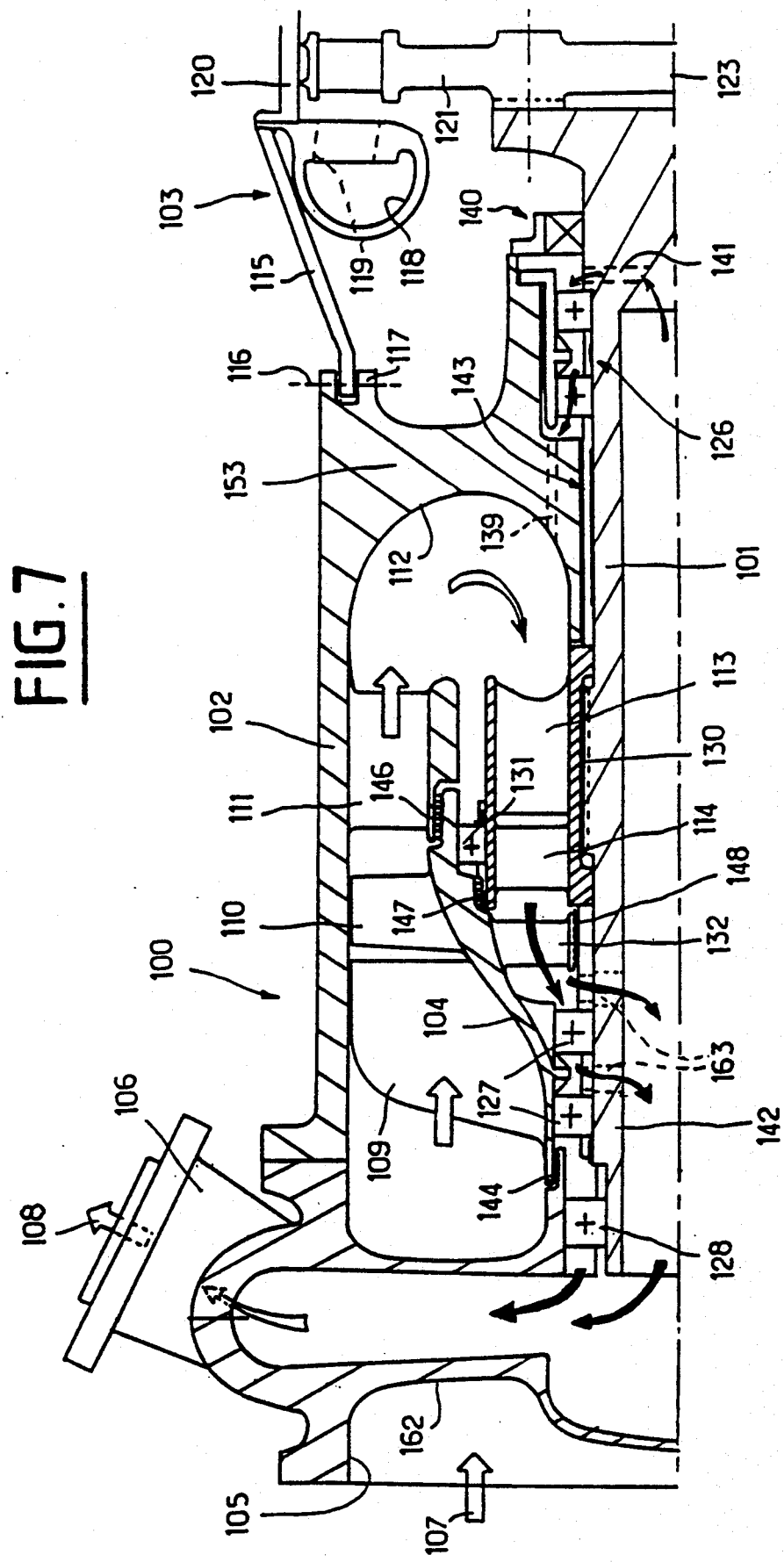
FIG. 7 is an axial half-section view through an axial flow turbopump with integrating boosting that constitutes a variant embodiment of the invention.

FIG. 7 shows a variant embodiment in which the main shaft 101 is not extended beyond the channels of the radial arms 162. The end of the main shaft 101 and the end 154 of the central channel 142 are situated in the plane which is tangential to the inside wall of the radial channels 162 situated adjacent to the impellers 110 and 114. This serves to reduce head losses and to eliminate members for mounting one of the bearings 128 of FIG. 1 situated beyond the through orifices 154. The remaining bearing 128 must then be reinforced or constituted by a pair of bearings.

I claim:

1. An axial flow turbopump with integrated boosting for pressurizing a fluid, comprising within a single casing:
   a main shaft driven by a turbine;
   a secondary shaft coaxial with the main shaft;
   at least one low pressure inducer mounted inside the casing on the secondary shaft in the vicinity of an inlet for low pressure working fluid;
   at least one low pressure boost impeller mounted on the secondary shaft downstream from the low pressure inducer;
   a low pressure baffle secured to the casing and disposed downstream from the low pressure impeller to restore the medium pressure fluid flow parallel to the axis of the turbopump; and
   a return channel for deflecting the medium pressure fluid flow from the baffle through 180° and for returning said flow parallel to the axis of the turbopump towards a high pressure impeller mounted on the main shaft inside the secondary shaft in such a manner as to deliver the entire high pressure centrifugal flow formed by the high pressure impeller axially towards a boost turbine secured to the secondary shaft and to the low pressure boost impeller and disposed between the main shaft and the secondary shaft, through orifices and an axial channel being formed in the main shaft to pass a flow of high pressure fluid leaving the boost turbine inside the main shaft and then to exhaust the high pressure fluid towards a delivery channel secured to the casing via radial arms situated at the inlet of the turbopump;
   the high pressure impeller constituting a high pressure pump coupled to a low pressure boost pump constituted by the low pressure inducer and the low pressure impeller and constituting a unitary assembly.

2. A turbopump according to claim 1, further including a high pressure inducer mounted on the main shaft between the return channel and the high pressure impeller.

3. A turbopump according to claim 1, wherein the low pressure boost pump defines a low pressure fluid flow which is essentially parallel to the axis of the turbopump, whereas the high pressure pump is arranged in such a manner that the high pressure impeller delivers the high pressure fluid axially towards the inside of the main shaft and then towards the delivery channel in a plane approximately perpendicular to the axis of the turbopump, passing through the flow of low pressure fluid via said radial arms without chemical interchange.

4. A turbopump according to claim 2, wherein the main shaft driven at high speed by the turbine is mounted relative to the casing firstly by means of a rolling bearings disposed between said radial arms and the front end of the main shaft, and secondly by a high speed bearing mounted in a backplate of the return channel.

5. A turbopump according to claim 4, wherein the secondary shaft is mounted on the main shaft via a roller bearing and ball bearings lubricated and cooled by the flow of working fluid.

6. A turbopump according to claim 4, wherein said bearing mounted in the backplate of the return channel is a ball bearing that is lubricated and cooled by a low flow rate of high pressure fluid taken from the axial channel via a short recirculation channel formed in the main shaft and returned to the return channel via a short channel.

7. A turbopump according to claim 4, wherein said bearing mounted in the backplate of the return channel is one of a fluid bearing or a foil bearing fed with a small flow rate of high pressure fluid taken from the axial channel via a short recirculation channel formed in the main shaft and returned to the return channel by a short channel.

8. A turbopump according to claim 4, wherein said bearing mounted in the backplate of the return channel is an active magnetic bearing cooled by a low flow rate of high pressure fluid taken from the axial channel via a short recirculation channel formed in the main shaft and returned to the return channel via a short channel.

9. A turbopump according to claim 4, wherein the rolling bearings disposed between said radial arms and the front end of the main shaft are lubricated and cooled by means of the flow of high pressure working fluid from the axial channel and returned towards the delivery channel.

10. A turbopump according to claim 1, including dynamic sealing mean between the impeller of the low pressure pump and the impeller of the high pressure pump, which means comprise fluid seals.

11. A turbopump according to claim 10, including first and second successive sets of oppositely-directed seals disposed respectively between the secondary shaft and the impeller of the high pressure pump, and between the secondary shaft and the low pressure baffle secured to the casing.

12. A turbopump according to claim 1, including dynamic sealing means between firstly the members secured to the secondary shaft forming a portion of the impeller of the low pressure pump and secondly the radial arms and the main shaft which comprise fluid seals having operating clearance that minimizes fluid flows between the high pressure fluid flow injected into the axial channel and exhausted via the radial arms and the inlet low pressure fluid flow.

13. A turbopump according to claim 4, wherein the return channel is delimited by a casting integrated in the casing and provided with reinforcing ribs and wherein a shock absorbing annular gasket is interposed between said casing and the main shaft.

14. A turbopump according to claim 1, wherein the gas turbine driving the main shaft includes a casing connected via radial studs to the casing of the turbopump.

15. A turbopump according to claim 1, wherein the channels formed through the radial arms open out into a torus which is itself in communication with the delivery channel.

16. A turbopump according to claim 1, wherein the main shaft and a communication orifice between the axial channel of the main shaft and the radial arms are situated in a plane tangential to the inside walls of the radial arms situated adjacent to the low pressure impeller and to the high pressure impeller.

17. A turbo pump according to claim 10, wherein said fluid seals comprise at least one of the following elements: wiper labyrinths, rings, and floating rings.

* * * * *